United States Patent
Nadsady

[15] 3,669,472
[45] June 13, 1972

[54] COUPLING DEVICE WITH SPRING LOCKING DETENT MEANS

[72] Inventor: Clarence A. Nadsady, Downey, Calif.
[73] Assignee: E. B. Wiggins, Inc., Los Angeles, Calif.
[22] Filed: Feb. 3, 1971
[21] Appl. No.: 112,126

[52] U.S. Cl. ...................285/87, 151/13, 285/233, 285/348, 339/89 R
[51] Int. Cl. .......................................F16l 15/00
[58] Field of Search.................285/233, 234, 82, 84, 85, 87, 285/88, 348, 353; 151/11, 13; 339/89 R

[56] References Cited

UNITED STATES PATENTS 2,781,207  2/1957  Detweiler et al...................285/353 X

FOREIGN PATENTS OR APPLICATIONS 1,046,601  10/1966  Great Britain........................285/233
658,202  1/1929  France..................................285/353
692,067  7/1930  France..................................151/13

Primary Examiner—Dave W. Arola
Attorney—Paul A. Weilein

[57] ABSTRACT

A detachable coupling device for joining pipe and tubing members in end-to-end relation and providing an hermetic seal, comprising an axially contractible two-part coupling structure in which the parts are rotatably united by screw thread means and are operable to compress enclosed O-ring sealing members with respect to the connected tubing. Tightening of the coupling parts is readily accomplished, but untightening and particularly accidental loosening is restrained by unique releasable detent means in which spring fingers carried by one of the coupling parts engage indentations or notches on the other coupling part in such a manner as to favor relative rotation of the parts in one direction while restraining with greater force the rotation of the parts in the opposite direction.

10 Claims, 6 Drawing Figures

PATENTED JUN 13 1972 3,669,472

INVENTOR
CLARENCE A. NADSADY
BY
Paul A. Weilein
ATTORNEY 3,669,472

COUPLING DEVICE WITH SPRING LOCKING DETENT MEANS

BACKGROUND OF THE INVENTION

The present invention relates generally to detachable couplings for sealingly joining the adjacent ends of axially aligned pipe or tubing sections, and is more particularly concerned with unique means for releasably locking the coupling parts in a tightened condition.

A common means of joining pipe and tubing having a circular cross section is to provide an annular ridge or projection at or near the ends of the two pieces of tubing to be joined, and to connect them together with an essentially two-part coupling device which may be tightened by means of screw threads, so as to join the tubing ends and at the same time provide a seal so as to insure a pressure tight joint. Coupling devices of this general type are exemplified by the disclosure in the Detweiler et al. U.S. Pat. No. 2,826,437. This general type of coupling device is in wide use in the aircraft and aerospace industries, particularly for joining fuel lines, hydraulic pressure lines, and the like.

It will be readily appreciated that, when couplings of the type described above are used on hydraulic fluid pressure lines, particularly, on aircraft, the fluid pressure inside the tubing is subjected to great variation. Accordingly, the seal provided by the coupling must be absolutely leakproof, and the coupling itself must be tightened up in such a fashion that it will not work loose in spite of the tension to which the entire coupling assembly is subjected during pressure surges. To prevent loosening of the rotatable connected parts of the coupling, it was the custom to wire the parts together, but this expedient increases assembly time and also makes servicing of the lines more difficult, particularly when the enormous number of such couplings in a modern aircraft is considered.

In addition to the above noted types of couplings, it has also been generally known in the prior art to construct coupling devices with spring detent retaining means. Such couplings are exemplified by the disclosure in the Merriman U.S. Pat. No. Re. 23,586 wherein a coupling sleeve or nut carried upon one coupling part is provided with a series of ratchet teeth which are engaged by spring finger means carried upon the other coupling part. The spring fingers engage the ratchet teeth with a pawl-like action to form a unidirectional lock to prevent retrograde movement of the sleeve or nut, when the latter is rotated to effect coupling, and in which the sleeve or nut is also formed to provide, when the sleeve or nut is positively or intentionally operated in the reverse direction to effect uncoupling, that the spring fingers are automatically forced out of engagement with the ratchet teeth so as to release the lock and thereby permit such uncoupling operation to be effected.

The arrangement of this patent is rather complicated and is not readily adaptable for the purpose intended in the present invention. As a consequence, the present invention proposes a unique releasable detent locking means wherein different resisting forces are applied during coupling and uncoupling operations, and tend to restrain inadvertent uncoupling or loosening by a resisting force that is greater than the resisting force during a coupling operation.

SUMMARY OF THE INVENTION

Having in mind the inadaptability and inherent disadvantages of the prior art structures as exemplified by the above noted patents, it is an object of the present invention to provide an improved coupling device for sealingly connecting tubular sections in end-to-end relation, and in which the coupling structure is of two-part construction and includes unique releasable detent locking means which permits easy coupling, but opposes uncoupling operation by a greater resisting force.

A further object of the present invention is to provide a coupling device of the type described which may be readily made tight and secure by simple hand tightening; which is secure against accidental loosening during service; and yet which may be unscrewed without undue difficulty should the need arise.

Another object is to provide a coupling structure having a nut part and a body part threadedly connected, and in which a detent component is supported in a unique manner in the nut assembly and includes a flexible fingers having ends engageable in spaced notches on the body part in such a manner as to present ramp faces of engagement which are disposed at different angles so as to provide different resisting forces when the nut is rotated in opposite directions.

Further objects and advantages of the invention will be brought out in the following part of the specification, wherein detailed description is for the purpose of fully disclosing a preferred embodiment of the invention.

BRIEF DESCRIPTION OF THE DRAWINGS

Referring to the accompanying drawings, which are for illustrative purposes only.

DESCRIPTION OF A PREFERRED EMBODIMENT

In general, and in accordance with the illustrated embodiment of the present invention, there is shown a coupling device, as generally indicated at C, as used for interconnecting pipes, tubing, and the like, preferably having an annular projection at or near the end thereof which is to be joined, said projection being preferably in the form of a flanged ferrule connected by swaging or other suitable means. Such projection may also consist simply of one or more beads circumferentially formed at the end of the pipe or tubing section by a simple upsetting operation.

Figure 1:
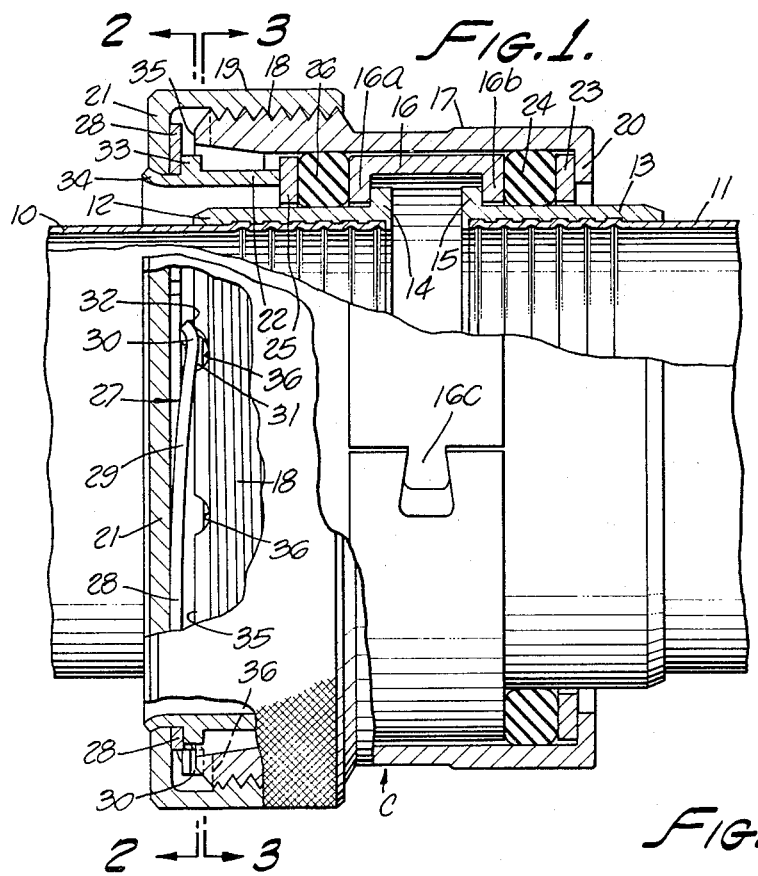
FIG. 1 is a side elevational view, partly in section, and partially cut away, showing a coupling device according to the present invention.

More specifically, in FIG. 1, the numerals 10 and 11 indicate two members which are to be joined in end-to-end relation, whereas numerals 12 and 13 indicate ferrules which are shown as being swaged to the ends of the joined members, and carry circular flanges 14 and 15 respectively. In place of the ferrule, the projection may take the form of a bead, as shown in FIG. 1 of the above noted Detweiler et al. patent, although a bead construction is seldom encountered in present day technology, and for that reason is not shown in detail in the drawings.

The illustrated coupling device includes an annular inwardly opening channel 16 which surrounds the adjacent ends of the connected members and has side flanges 16a and 16b engaged respectively over the circular flanges 14 and 15. For convenience in assembly, the channel 16 is preferably made of spit construction, as generally indicated at 16c in FIG. 1. As will be readily seen from the drawing, the channel 16 prevents the two connected members from being pulled apart under the influence of pressure built up therein.

Surrounding the channel 16, there is provided a two-part coupling structure which essentially consists of a cylindrical body part 17 which is endwise connected by suitable screw thread means 18 to a nut part 19. The body part 17 carries an end flange 20, while the nut part 19 carries an end flange 21. It will be observed that this end flange 21 coaxially supports an inner ring member 22 in an inwardly radially spaced concentric position in which its innermost end will extend into the adjacent end of the body part 17 for coaction with the end flange 20 to motivate sealing means, as hereinafter designated, into sealing position with respect to the joined ends of the members 10 and 11, when the coupling structure is contracted.

As shown, the sealing means comprises an outer first washer 23 and associated inner first sealing O-ring 24 positioned in the space between the flange 20 and the channel flange 16b in surrounding relation to the ferrule 13; and an outer second washer 25 and associated inner second sealing O-ring 26 positioned in the space between the inner end of the ring member 22 and the channel flange 16a in surrounding relation to the ferrule 12. It will be seen from the foregoing that as the coupling structure is axially contracted by threaded relative rotation of its parts, the O-rings 24 and 26 will be compressed into their associated annular spaces and provide in each case a peripheral seal on the associated ferrule.

A main feature of the present invention, as previously mentioned, resides in the provision of a coupling device in which the coupling parts are normally restrained against actuation to an uncoupled condition by a greater retention force than that required to actuate the coupling parts into a connecting sealed position. To such end, the cylindrical body part 17 and the nut part 19 are interconnected by resiliently engaged elements which coact to resiliently oppose relative rotational movement of the parts at spaced dwell points, and wherein at each dwell point relative movement of the parts is opposed with a greater force in a coupling disconnecting direction, than the force opposing the relative movement of the parts in a coupling connecting direction.

Figure 6:
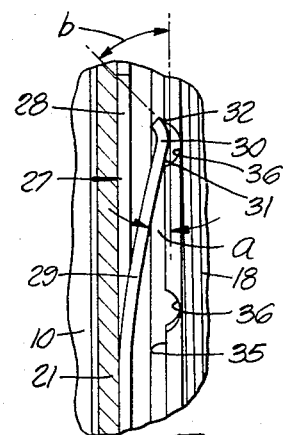
FIG. 6 is a fragmentary detail view showing the initial disposition of the spring detent means at the commencement of the tightening operation of the coupling device.
Figure 5:
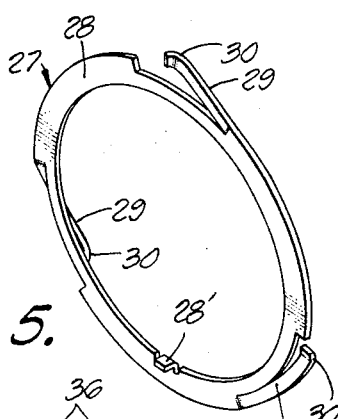
FIG. 5 is a perspective view of the unique spring detent means as utilized in the coupling device of the present invention.
Figure 2:
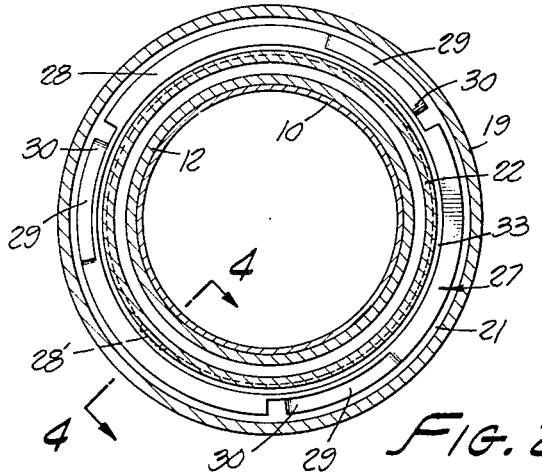
FIG. 2 is a transverse sectional view at one end of the coupling device, taken substantially on line 2—2 of FIG. 1.

For such purpose, there is provided on the nut part 19 a detent component as generally indicated by a numeral 27 and shown in detail in FIG. 5. More specifically, the component comprises a generally flat washer-like ring body 28 from which integrally formed spaced elongate portions are struck up or otherwise formed to provide a plurality of spring finger elements 29 in circumferentially spaced relation around the ring body and respectively extending from one side thereof at an angle to the plane of the ring body. Each finger at its free end is curved, as indicated at 30, to provide contiguous angular ramp faces 31 and 32 respectively, as best shown in FIG. 6. The effective angle of the face 31 as shown by the arrows at $a$ is less than the angle of the face 32 as shown by the arrows at $b$.

Figure 4:
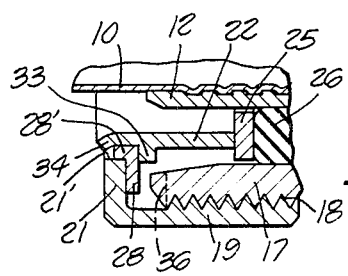
FIG. 4 is a fragmentary sectional detail view, taken substantially on line 4—4 of FIG. 2.

The detent component 27 is fixedly mounted on the nut part 19 during initial assembly of the ring member 22, by clampingly embracing the ring body 28 in a position surrounding the outer end of the inner ring member 22 between the flange 21 and an outer circumferentially extending flange 33 inwardly spaced from the outer end terminus of the ring member 22, when the outer end margin is coined or flared over the inner peripheral edge of the flange 21, as indicated at 34. If desired, the ring body 28 may be further anchored against rotation by providing an integral projecting ear 28' which is adapted to seat in an appropriate notch or opening 21' (FIG. 4) in the associated flange 21.

Figure 3:
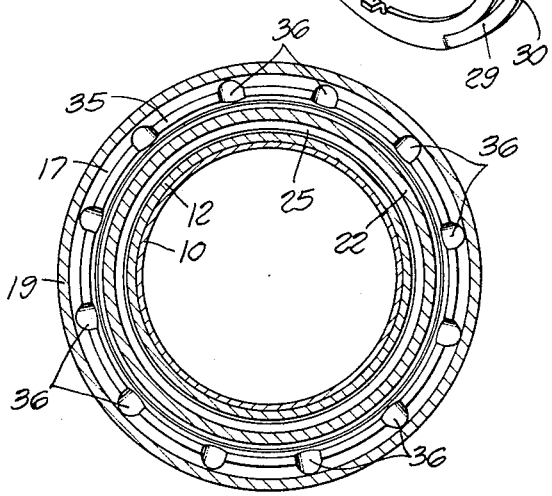
FIG. 3 is a similar end sectional view looking in an opposite direction, taken substantially on line 3—3 of FIG. 1.

The detent component 27 is operatively arranged to function in connection with the body part 17, and for such purpose an end face 35 thereof is provided with a plurality of circumferentially equally spaced indentations in the form of U-shaped notches 36, as may be best seen in FIG. 3. These notches form spaced dwell points, and each notch is adapted to operatively receive the curved end 30 of a finger element 29 and with the ramp faces 31 and 32 respectively engaged with opposite edges of the notch as shown in FIG. 6. It will be apparent that as thus arranged the smaller ramp angle $a$ will present a smaller resistance to the displacement of the end 30 from a notch during tightening movement of the nut part 19 on the body part 17, and that the greater ramp angle $b$ will present a greater resistance to displacement when the nut part 19 is moved in an untightening direction. This difference in the resisting torque action is readily appreciated upon tightening and untightening of the coupling device. The coupling device is very easily tightened by clockwise rotation of the nut part 19, and as rotation is continued, the ends of the fingers 29 will successively engage the indentations or notches, and as the nut part is further tightened it will require an ever greater torque force to move from one latching dwell position to the next, because of the dual effects arising from the spring loading of the fingers 29 and the compression of the O-rings 24 and 26. At any given stage in the tightening action, however, if an attempt is made to untighten the nut part by rotation in the opposite direction, a much greater torque is needed to displace the finger ends from their engaged notches.

It will be appreciated that it is not necessary to provide as many spring fingers on the detent component 27 as there are indentations or notches 36. It is sufficient to provide a number of spring fingers at equal angularly spaced intervals, and then provide at least one corresponding set of notches at the same angular separation on the part 17. Of course, it gives greater precision and a finer range of degrees of tightening to provide the sets of notches in multiple. Thus, in the illustrative embodiment, three fingers are provided at mutual angular separations of 120°; and four sets of equally spaced notches, that is a total of 12, at angular separations of 30°. Obviously, a still finer adjustment could be provided by additional sets of notches, but the arrangement illustrated is quite adequate and is preferred.

The materials of which the coupling device of the disclosed invention is constructed may be chosen from a wide variety of substances. In the preferred embodiment, the O-rings are oil-resistant synthetic rubber, while all other parts are of anodized aluminum with the exception of the detent component 27 which is spring steel. Other materials may of course be selected, such as phosphor bronze or beryllium copper or stainless steel spring stock for the detent component; while the remaining parts except for the O-rings may be made of stainless steel, brass, magnesium alloys, high strength plastic such as nylon or polycarbonate resins, and the like.

It will be seen that the invention accomplishes its objects, in providing a coupling device of the type described which can readily be tightened by hand and is not subject to accidental loosening.

While the invention has been described in terms of illustrative embodiments, it is to be understood that it is not to be considered as limited to the exact details of construction and selection of materials as shown and described, for obvious modifications will occur to persons skilled in the art.

What is claimed is:

1. A coupling device for sealingly connecting the adjacent ends of axially aligned members in end-to-end relation, comprising:
   a. a coupling structure having two cylindrical parts threadedly connected at adjacent ends and upon relative rotation being axially contractible, the other ends of said parts being adapted to respectively surround the members to be coupled;
   b. sealing means for peripherally sealing the adjacent ends of the coupled members and said coupling structure in response to the axial contraction of said coupling structure; and
   c. detent means interconnecting the threadedly connected ends of said parts, said detent means having resiliently engaged elements coacting to yieldably oppose relative rotational movement of said connected parts at spaced dwell points, and at each dwell point yieldably restraining relative movement of the parts therefrom in opposite directions.

2. A coupling device according to claim 1, wherein the relative movement of said parts from said dwell points is restrained by a greater resistive force in one direction than in the opposite direction.

3. A coupling device according to claim 1, wherein one of said coupling structure parts comprises a rotatable nut and the other part comprises a cylindrical body, and the detent means comprises spring urged elements carried by said nut, and a series of spaced depressions carried by the cylindrical body positioned in the path of travel of said spring urged elements and providing dwell points at which incremental movements of the nut will be releasably retained.

4. A coupling device for sealingly connecting the adjacent ends of axially aligned members in end-to-end relation, comprising:
   a. a coupling structure having two cylindrical parts threadedly connected at adjacent ends and upon relative rotation being axially contractible, the other ends of said parts being adapted to respectively surround the members to be coupled, one of said parts comprising:
      a nut assembly having a threaded bore and an inner annular flange, an axially extending elongate ring member of smaller diameter than the threaded bore supported at one end from the inner periphery of said annular flange of the nut, and having an outer circumferential flange,
   b. sealing means for peripherally sealing the adjacent ends of the coupled members in response to the axial contraction of said coupling structure; and
   c. detent means interconnecting the threadedly connected ends of said parts, said detent means having resiliently engaged elements coacting to releasably oppose relative rotational movement of said connected parts at spaced dwell points, and at each dwell point restraining relative movement of the parts therefrom in opposite directions, said detent means comprising:
      an annular flat body member gripped between said inner annular flange of the nut and the outer circumferential flange of the ring member, said body member having a plurality of integral inclined spring fingers positioned to coact with associated detent elements carried by the other part of said coupling structure.

5. A coupling device according to claim 4, wherein the detent elements carried by the other part of said coupling structure comprise a plurality of circumferentially spaced U-shaped notches adapted to seatingly receive a curved portion formed at the outer end of each of said spring fingers.

6. A coupling device according to claim 5, wherein the U-shaped notches are positioned in a confronting end surface of said other part of said coupling.

7. A coupling device according to claim 5, wherein said curved portion at the outer end of the spring finger presents contiguous ramp faces having different effective seating angles of engagement with the opposite edges of the associated notch, whereby a greater resisting force opposes displacement of the finger end portion from the notch in one direction of nut rotation than in an opposite direction of rotation thereof.

8. A coupling device according to claim 1, wherein the other part at its outer end carries an inner annular flange, and including annular channel means connecting the adjacent ends of the axially aligned members against separation, and wherein the sealing means are positioned between said channel means and the inner end of the elongate ring member of the nut assembly, and between said channel means and the inner annular flange of said other part.

9. A coupling device for releasably joining the ends of tubing members having an end terminal surrounding projection, comprising:
   an annular channel circumscribing and enclosing the adjacent end projections of tubing members in coaxial alignment;
   a coupling structure surrounding said channel having two cylindrical parts threadedly connected at adjacent ends and upon relative rotation being axially contractible, the outer ends of said parts being adapted to respectively surround the adjacent ends of the coupled tubing members, and each of said outer ends having an inwardly extending end flange axially outwardly spaced from said channel;
   an O-ring surrounding each coupled tubing end positioned between the end flange of the associated part and the channel, whereupon the axial contraction of the coupling structure will compress the O-rings into a sealing condition between said channel, coupled tubing and said end flanges;
   a plurality of circumferentially equally spaced notches carried by one of said parts; and
   spring detent means carried by the other of said parts including spring fingers having ends yieldably engageable in said notches and coacting therewith to form a low ramp angle on the leading side in the tightening sense of said parts and a relatively high ramp angle on the leading side in the untightening sense of said parts, whereby said parts may be relatively rotated in a direction to contract the coupling structure more readily than in the opposite direction, so as to compress both O-rings into a sealing condition at the same time that the ends of the spring fingers are pressed with increasing pressure against said notches.

10. A coupling device according to claim 9, in which one of said coupling structure parts is a nut and the other part is a cylindrical body, the spring fingers being carried by the nut and the notches being carried by the cylindrical body.

* * * * *

UNITED STATES PATENT OFFICE
CERTIFICATE OF CORRECTION

Patent No. 3,669,472          Dated June 13, 1972

Inventor(s) Clarence A. Nadsady

It is certified that error appears in the above-identified patent and that said Letters Patent are hereby corrected as shown below:

Column 6, line 2, "claim 1" should read --claim 4--.

Signed and sealed this 5th day of September 1972.

(SEAL)
Attest:

EDWARD M. FLETCHER, JR.
Attesting Officer

ROBERT GOTTSCHALK
Commissioner of Patents